(12) United States Patent
Tischler et al.

(10) Patent No.: US 7,933,556 B2
(45) Date of Patent: Apr. 26, 2011

(54) REMOTE VIDEO ACCESS CAPABILITY FOR A WIRELESS VIDEO MONITORING/CORDLESS PHONE SYSTEM

(75) Inventors: Ralph Tischler, Surrey (CA); Gordon Ryley, Calgary (CA)

(73) Assignee: VTech Telecommunications Limited, Hong Kong (HK)

( * ) Notice: Subject to any disclaimer, the term of this patent is extended or adjusted under 35 U.S.C. 154(b) by 563 days.

(21) Appl. No.: 10/395,126

(22) Filed: Mar. 25, 2003

(65) Prior Publication Data

US 2004/0203386 A1    Oct. 14, 2004

Related U.S. Application Data

(60) Provisional application No. 60/434,405, filed on Dec. 19, 2002.

(51) Int. Cl.
*H04B 7/00* (2006.01)

(52) U.S. Cl. ............. 455/66.1; 379/201.05; 379/406.08; 348/143; 348/14.02; 340/574; 358/442

(58) Field of Classification Search .................. 455/462, 455/572, 512, 556.1, 41.2; 379/201.05, 406.08, 379/53; 348/143, 15, 14.02; 340/574; 358/442
See application file for complete search history.

(56) References Cited

U.S. PATENT DOCUMENTS

| | | | |
|---|---|---|---|
| 4,510,526 A * | 4/1985 | Coutta et al. | 348/143 |
| 4,715,059 A * | 12/1987 | Cooper-Hart et al. | 348/14.14 |
| 5,402,167 A * | 3/1995 | Einbinder | 348/152 |
| 5,930,719 A * | 7/1999 | Babitch et al. | 455/462 |
| 6,111,662 A * | 8/2000 | Satoh et al. | 358/442 |
| 6,256,519 B1 * | 7/2001 | Newton | 455/572 |
| 6,433,683 B1 | 8/2002 | Robinson | |
| 6,476,858 B1 | 11/2002 | Ramirez Diaz et al. | |
| 6,512,929 B1 * | 1/2003 | Sandre | 455/512 |
| 6,690,947 B1 * | 2/2004 | Tom | 455/556.1 |
| 7,054,415 B2 * | 5/2006 | Beere | 379/51 |
| 7,165,224 B2 * | 1/2007 | Pyhalammi | 715/748 |
| 2001/0008415 A1 * | 7/2001 | Park | 348/143 |
| 2003/0083098 A1 * | 5/2003 | Yamazaki et al. | 455/556 |

FOREIGN PATENT DOCUMENTS

EP    0 935 377    8/1999
(Continued)

OTHER PUBLICATIONS

GB Search Report dated May 21, 2004.

*Primary Examiner* — Zhiyu Lu

(74) *Attorney, Agent, or Firm* — McAndrews, Held & Malloy, Ltd.

(57) ABSTRACT

A multimode cordless telephone system that can be used for remote video monitoring. The system includes a base station, at least one camera that is in wireless communication, at least periodically, with the base station, and a cordless handset, having a viewing screen, also in wireless communication, at least periodically, with the base station, the cordless handset having a first mode that is operable when the cordless handset is within a predetermined range of the base station wherein the cordless handset operates in conjunction with the base station to provide telephonic communication and image monitoring of images captured by the cameras, and a second mode that is operable when the cordless handset is beyond the predetermined range of the base station wherein the cordless handset communicates with the base station over the public switched telephone network (PSTN) to monitor images captured by the cameras.

9 Claims, 2 Drawing Sheets

FOREIGN PATENT DOCUMENTS

| | | | |
|---|---|---|---|
| EP | 1 124 375 | | 8/2001 |
| GB | 2360898 | * | 10/2001 |
| JP | 04291876 | * | 10/1992 |
| JP | 06046413 | * | 2/1994 |
| JP | 2002-084445 | * | 3/2002 |
| WO | WO 97/19558 | | 5/1997 |

* cited by examiner ized to send images to an email address from which
REMOTE VIDEO ACCESS CAPABILITY FOR A WIRELESS VIDEO MONITORING/CORDLESS PHONE SYSTEM This application claims the benefit of U.S. Provisional Application No. 60/434,405, filed Dec. 19, 2002, which is herein incorporated by reference in its entirety.

BACKGROUND

1. Field of the Invention

The present invention is directed to improvements in telephone and telecommunications systems. More particularly, the present invention is directed to improvements to cordless telephone sets to allow such sets to remotely access and receive video signals or images over the public switched telephone network (PSTN).

2. Background of the Invention

Video monitoring systems including those designed primarily for in-home use are known. One such system is offered by Nokia and includes a camera that can be programmed to take images automatically at a designated time interval and send the images to a mobile telephone that is multimedia message-enabled and has a color screen. Alternatively, the camera can be configured to send images to an email address from which the images can be viewed. While the Nokia system offers users the ability to remotely monitor images that a camera picks up, the camera in the Nokia system is actually a mobile telephone that sends images over a GSM wireless network. In other words, owners of the Nokia system are required to subscribe to at least one wireless service account for the camera, and if wireless telephone access is desired, a second subscription must be entered into for the user's multimedia message-enabled telephone. The prospect of having to pay for and manage separate wireless service subscriptions is undesirable for most consumers, especially those with lower incomes.

Kador Ltd. offers another in-home imaging system. This system comprises a stand alone digital camera with a built-in modem. The camera takes pictures and sends them over PSTN telephone lines to a computer selected by the user. While simpler in overall architecture compared to the Nokia system just described, the Kador system is severely limited in that the user must have access to a computer that is always connected to the PSTN.

VPON, or Video Picture On Net, is yet another remote image system. VPON is advertised as a plug-&-play remote video camera server that has a built-in mini web server that provides real time video capture and streaming over the internet, an intranet, or direct telephone connection. Like the Kador system, however, the VPON system also requires access to, at the very least, a computer.

There are also a wide variety of home monitoring systems that rely on analog video that is captured by one or more cameras and fed to a transceiver. The transceiver is connected to the PSTN. A similar transceiver is provided at another end of a PSTN connection and is connected to a video monitor, such as a television set. When a call is established between the two transceivers, analog video signals from the cameras are sent over the PSTN and can be monitored remotely.

Thus, while many types of in-home monitoring systems are presently available including ones comprised of a camera unit that functions as mobile telephone itself, ones that link to a personal computer and incorporate a telephone modem, or ones that transmit analog video, there still remains a need for improved functionality and features in this field.

SUMMARY OF THE INVENTION

The present invention provides unique advancements in remote monitoring. In accordance with embodiments of the present invention, a wireless video monitoring/cordless telephone system is modified to enable monitoring of associated camera units from not only inside the home, but also from remote locations. More specifically, a mechanism is provided in a cordless telephone handset having a video screen to remotely monitor wireless cameras through the PSTN by, in at least one embodiment, establishing a PSTN call between the cordless handset and its associated cordless base station, which is itself in communication with the wireless cameras. To achieve this remote monitoring functionality, the cordless handset is preferably modified to be connectable directly to the PSTN via, e.g., a conventional RJ11 jack. The cordless handset, in accordance with the present invention, thus has two modes: a first mode in which it functions as a cordless handset that communicates with a base station and is also capable of monitoring images captured by the cameras, and a second mode in which the cordless handset functions as a "non-cordless" video telephone that is connectable directly to the PSTN to communicate, as desired, with the base station to retrieve images that are captured by any one of the cameras.

The functionality described above as well as other features and attendant advantages thereof will be more fully understood upon a reading of the detailed description in combination with the associated drawings.

DETAILED DESCRIPTION

A significant goal of the present invention is to enhance the capability of a wireless video monitoring/cordless telephone system to enable monitoring of camera units from not only inside the home, but from remote locations. Although this description focuses primarily on an in-home application, those skilled in the art will appreciate that the scope of the invention is not so limited.

As will become clear to those skilled in the art, significant advantages of the present invention include (1) eliminating reliance on a stand alone computer or TV to conduct monitoring, (2) monitoring camera images via a cordless video handset, and (3) storing camera images on the handset or at the base station.

In accordance with embodiments of the present invention, an in-home cordless video handset is taken off-premises and used to dial into an associated base unit over the PSTN to remotely access in-home camera unit(s) that are in contact with the base unit. This is a more cost effective monitoring system compared to conventional remote monitoring solutions since access to a computer, such as a personal computer, is not required. Indeed, all that is required is access to the ubiquitous PSTN.

Figure 1:
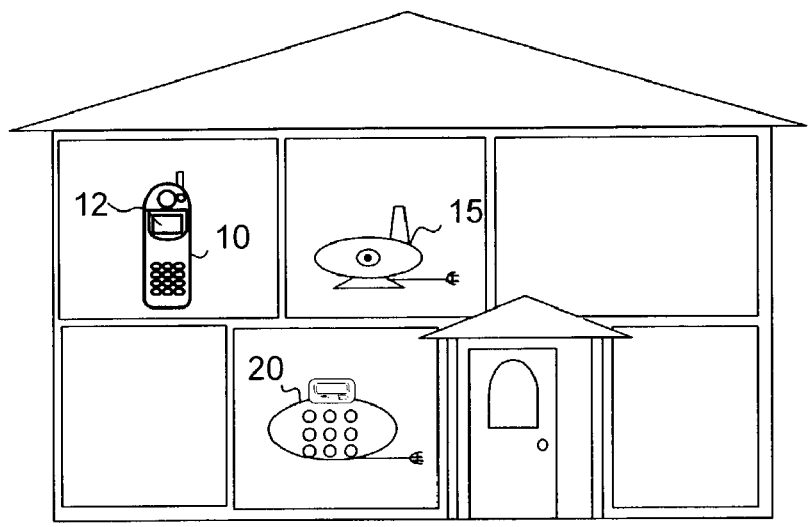
FIG. 1 illustrates the basic components of an in-home wireless video monitoring/cordless phone system in accordance with the present invention.

FIG. 1 illustrates the basic components of an in-home wireless video monitoring/cordless phone system. The system allows a handset 10 equipped with a color LCD viewing screen 12 to monitor a camera unit 15 placed anywhere in the home, via a wireless connection. Also shown in FIG. 1 is a base unit 20 that is connected to the PSTN and acts as an intermediary between cameras 15 and handset 10.

Figure 2:
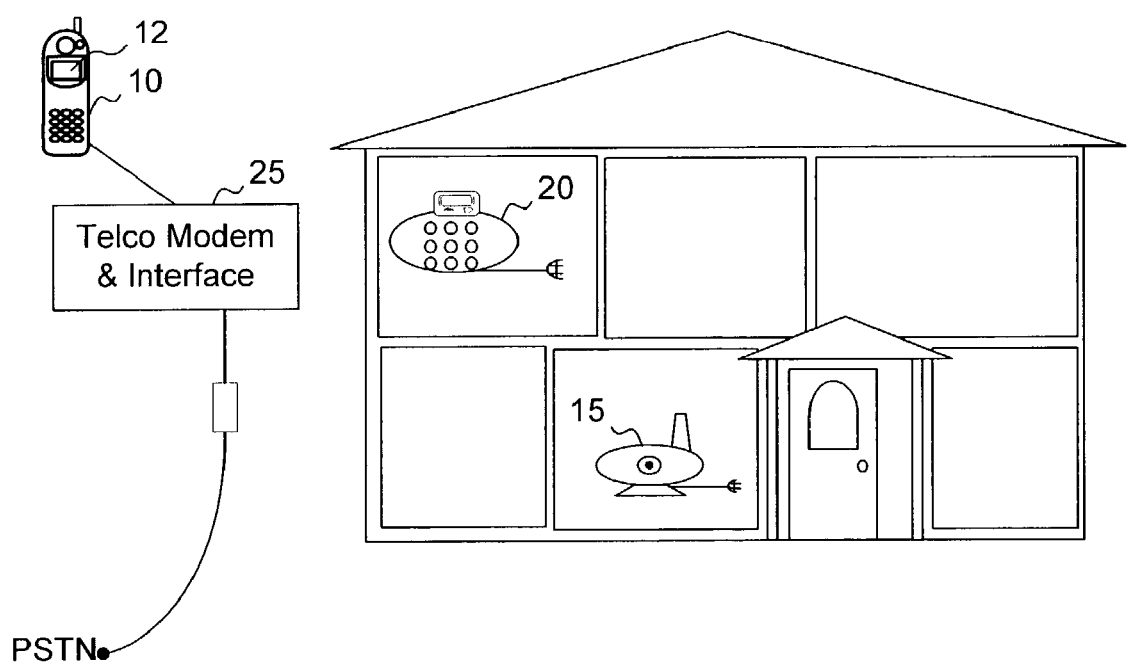
FIG. 2 is a block diagram that illustrates how the video handset unit can be used at a remote location in accordance with the present invention.

FIG. 2 is a block diagram that illustrates how the video handset unit can be used from a remote location and then, via a telephone modem interface adapter 25, be connected directly to the PSTN.

Handset 10 is used to dial directly into the home phone number where base station or unit 20 and remote camera 15 are located. Using a modem to modem communication session at approximately 2400 or 33000 BPS (or even higher speed), a still frame of video, e.g., a snapshot, can be sent from any camera unit in the house to the remote video handset over the PSTN. That is, the user may select to view any one or several images from different cameras 15 that are in communication with base station 20.

In one embodiment, the remote handset may also store the downloaded images for later review. Storing video or still images using RAM, for example, is well-known in the art.

Figure 3:
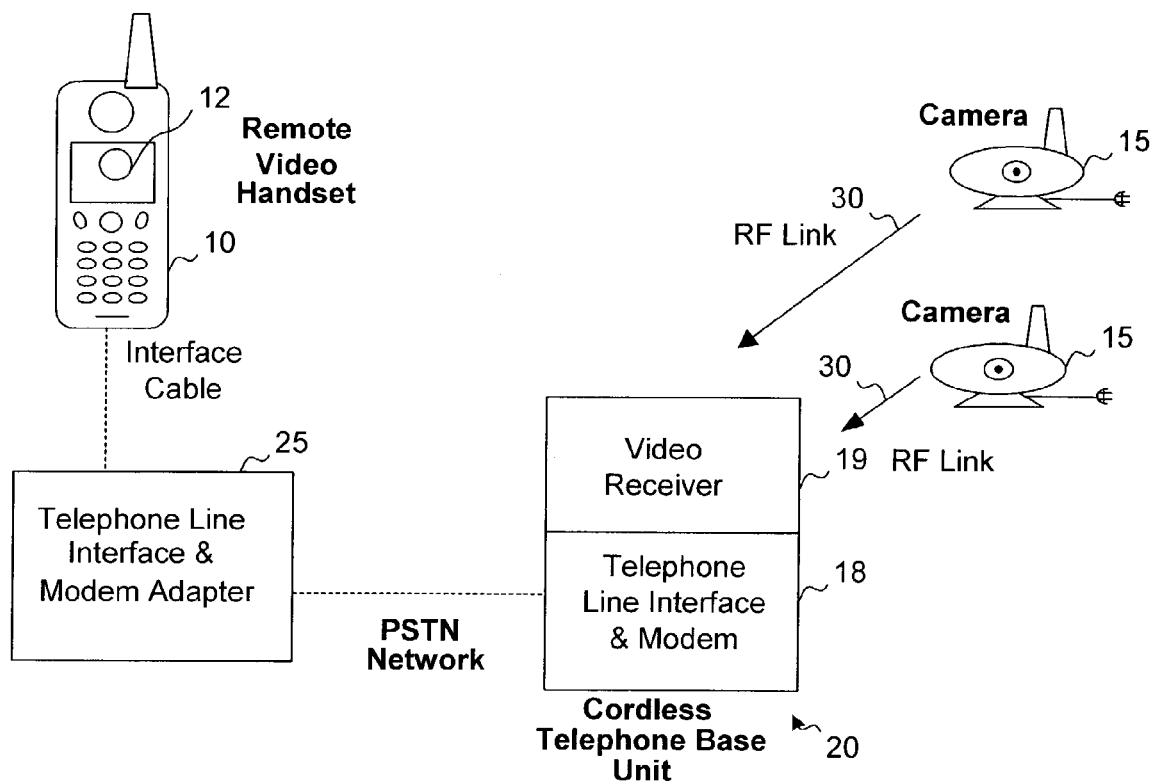
FIG. 3 shows a more detailed exemplary system diagram of components and their interconnectivity in accordance with the present invention.

FIG. 3 shows system components employed in an implementation of the present invention including cordless video handset 10 having telephone line interface/modem adapter 25 that is connected to the PSTN. Cordless telephone base station 20 preferably comprises a telephone line interface and modem circuit 18 to allow a point to point modem connection to be established between the remote handset and base station. Base station or unit 20 preferably also comprises a wireless video receiver 19 for receiving data from one or more cameras 15. Cameras 15 preferably also are capable of receiving control signals from base station 20.

The remote data connection preferably also allows access and control over camera viewing angle and operational parameters, and the ability to request a "snapshot" digital image (data file) from any camera. The image data file is thereafter transferred to the base unit 20 via an RF link 30 and then across the PSTN via the established data connection between the remote handset 10 and the base unit 20. In one embodiment, the base station itself comprises the camera, thereby avoiding having to have a separate wireless camera associated with the base station.

For simplicity, the image file that is transferred to the video handset is preferably already in the format required for presentation on the color LCD display built into handset 10. This image may be viewed and discarded, or stored in the handset internal memory for later viewing, or transferred to a PC or other data storage device.

To operate in accordance with the present invention, a conventional cordless telephone is preferably modified to include the necessary circuitry and interface (e.g., RJ11 jack) to connect directly with the PSTN. For example, a cordless handset in accordance with the present invention preferably includes necessary isolation circuitry, a hook switch, a DTMF generator and, if desired, a ring detector, all of which are well-known in the art.

In a variation to the embodiments described herein, instead of using the cordless telephone handset as the remote device, a dedicated unit including an LCD, line interface, and modem, that is specifically designed to communicate with the base station can be employed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A remote monitoring system, comprising:
a cordless telephone base station;
a cordless telephone handset associated with the cordless telephone base station that is operable to be in periodic direct wireless communication with the cordless telephone base station when in a predetermined distance from the cordless telephone base station, the cordless telephone handset including a viewing screen that can display an image, the cordless telephone handset comprising a telephone interface and a modem circuit to connect directly to the PSTN and communicate over the PSTN to the cordless base station; and
at least one camera that is wirelessly coupled to the cordless telephone base station and which is operable to capture an image of a predetermined area;
wherein the cordless telephone handset is configured to (i) receive images from the at least one camera via a wireless connection with the cordless telephone base station when the cordless telephone handset is within the predetermined distance and (ii) receive images from the at least one camera via the PSTN when it is directly connected to the PSTN,
wherein the cordless telephone handset comprises a storage device and is configured to store the received images in the cordless telephone handset for later viewing, to discard the received images, and to transfer the received images for storage in the cordless telephone base station,
wherein the cordless telephone base station is configured to store the received images transferred from the cordless telephone handset,
wherein the cordless telephone handset sends control signals through the cordless telephone base station and to the at least one camera to change a viewing angle of the at least one camera, and
wherein the telephone interface comprises an RJ11 jack and a DTMF generator, and wherein the cordless telephone handset is configured to establish a modem connection over the PSTN with the cordless telephone base station when the cordless telephone dials a first telephone number that is associated with a place where the cordless telephone base station is located.

2. The system of claim 1, wherein the handset is configured to transfer the received images for storage in another storage device different from and in addition to the cordless telephone base station.

3. The system of claim 2, wherein the cordless telephone base station comprises a video camera.

4. The system of claim 1, wherein the viewing screen is a color display.

5. The system of claim 1, wherein the cordless telephone base station comprises a telephone line interface and a modem circuitry configured to communicate with the cordless telephone handset over the PSTN.

6. A method of monitoring a location within wireless range of a base station, comprising:

capturing images with one or more cameras that communicate with a cordless telephone handset via the base station using a wireless communication, wherein the cordless telephone handset comprises a storage device, a telephone interface and a modem circuit to connect directly to the PSTN and communicate over the PSTN to the base station;

receiving from a user selection to change a viewing angle of the at least one camera and sending, by the cordless telephone handset, corresponding control signals through the cordless telephone base station to the at least one camera to change the viewing angle according to the user selections;

receiving the captured images in the base station; transmitting the captured images wirelessly from the base station to the cordless telephone handset when the cordless telephone handset is within a predetermined distance of a base station;

transmitting the captured images over the PSTN to the cordless telephone when the cordless telephone is not within the predetermined distance from the base station, which further comprising:

receiving a telephone call at the base station from the cordless telephone handset, wherein the telephone call is established over a PSTN by directly dialing, from the cordless telephone handset into a telephone number associated with a place where the base station is located, when the cordless telephone handset is beyond a predetermined range of the base station, and transmitting the images from the base station to the cordless telephone handset after receiving the telephone call to the base station, wherein the cordless telephone handset is configured to establish a modem connection over the PSTN when the cordless telephone handset dials a first telephone number that is associated with a place where the cordless telephone base station is located;

storing a transmitted captured image at the cordless telephone handset for later viewing when a selection for storage of the transmitted captured image in the cordless telephone handset is received from a user of the cordless telephone handset; and after the period of time, retrieving the transmitted captured image from the cordless telephone handset and displaying the retrieved image on the cordless telephone handset.

7. The method of claim 6, further comprising discarding the transmitted captured image from the cordless telephone handset after the period of time upon receiving a selection to do so from the user of the cordless telephone handset.

8. The method of claim 6, wherein the base station comprises a video camera.

9. The method of claim 6, further comprising displaying the transmitted capture image on a viewing screen of the cordless telephone handset, wherein the viewing screen is a color display.

* * * * *